United States Patent
Goulon et al.

(10) Patent No.: US 8,207,503 B2
(45) Date of Patent: Jun. 26, 2012

(54) X-RAY DETECTOR USABLE AT MICROWAVE FREQUENCIES

(75) Inventors: José Goulon, Corenc (FR); Gérard Goujon, La Motte d'Aveillans (FR); Andrei Rogalev, Rives (FR); Fabrice Wilhelm, Saint Egreve (FR)

(73) Assignee: European Synchrotron Radiation Facility, Grenoble Cedex (FR)

( * ) Notice: Subject to any disclaimer, the term of this patent is extended or adjusted under 35 U.S.C. 154(b) by 523 days.

(21) Appl. No.: 12/540,539

(22) Filed: Aug. 13, 2009

(65) Prior Publication Data
US 2010/0065748 A1 Mar. 18, 2010

(30) Foreign Application Priority Data
Aug. 13, 2008 (FR) ...................... 08 55566

(51) Int. Cl.
 *G01T 1/00* (2006.01)
 *G01T 1/15* (2006.01)
(52) U.S. Cl. .......... 250/370.01; 250/492.1; 250/370.12; 332/106; 324/76.14; 324/76.24; 257/6; 257/E47.002; 257/E47.001; 257/E21.34
(58) Field of Classification Search ............ 250/370.12, 250/492.2, 492.1, 370.09; 324/76.14, 76.23; 257/6, E47.002, E47.001, E21.34, 189; 332/110, 332/113, 109, 112, 115, 116
See application file for complete search history.

(56) References Cited

U.S. PATENT DOCUMENTS

2004/0241419 A1* 12/2004 Yao et al. ................... 428/319.1
2006/0138334 A1* 6/2006 Mochizuki ............... 250/370.09

FOREIGN PATENT DOCUMENTS
RU 2178602 C2 1/2002

OTHER PUBLICATIONS

Guimaraes et la., "Quantum wave packet revivals in IR + X-ray pump-probe spectroscopy," Chemical Physics Letters, vol. 405, pp. 398-403, published Mar. 16, 2005). Retrieved from internet [Mar. 6, 2012]; Retrieved from url <http:www.sciencedirect.com/science/article/pii/S0009261405002411>.*
"Element-Selective X-ray detected magnetic resonance: A Novel application of synchrotron radiation", Goulon J., Rogalev A., Wilhelm FI, Goulon-Genet CH; Goujon, G, Journal of Synchrotron Radiation, Apr. 11, 2007, pp. 257-271, XP002530795.
French Search Report issued Jun. 5, 2009 for application FR 0855566.

* cited by examiner

*Primary Examiner* — David Porta
*Assistant Examiner* — Yara Green
(74) *Attorney, Agent, or Firm* — Vedder Price PC

(57) ABSTRACT

A detector of periodic packets of X photons, each packet having a duration shorter than 0.1 nanosecond, comprising a sensor comprising a semiconductor element of type III-V biased in a negative differential resistance region, said sensor being arranged in a resonant cavity tuned to a multiple of the packet repetition frequency.

10 Claims, 3 Drawing Sheets

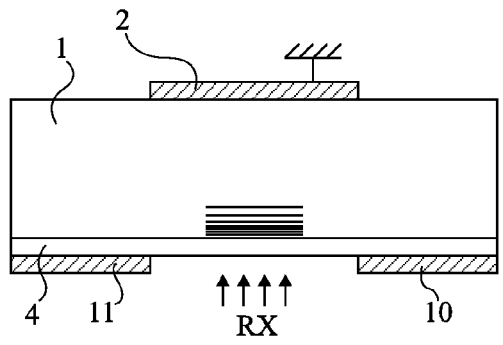
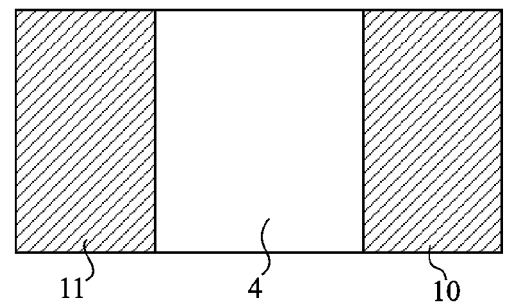
Fig 3A  Fig 3B
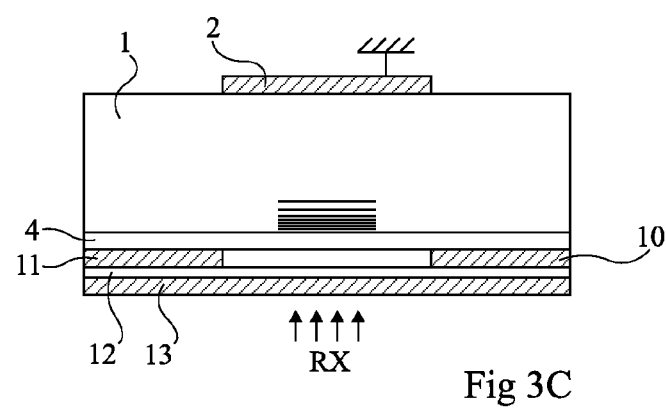
Fig 3C
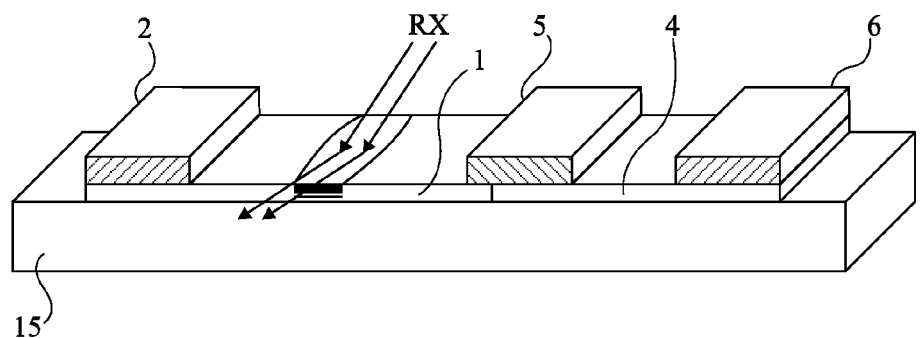
Fig 4

X-RAY DETECTOR USABLE AT MICROWAVE FREQUENCIES

FIELD OF THE PRESENT INVENTION

The present invention relates to an X-ray detector capable of measuring a modulation of an X-ray beam at microwave frequencies from 1 to 200 GHz, where the modulation amplitude can be very low, that is, for example, −100 dB below the D.C. signal level.

The present invention will more specifically enable to measure the very high frequency Fourier components of a periodic pulsed X-ray source emitting packets of X photons of a duration shorter than one tenth of a nanosecond. Such X photons will have a power from 2 to 20 keV, the number of X photons per packet varying from $10^3$ to $10^8$. These packets will repeat at a frequency depending on the technology of the source used: it will be at most a few MHz for an X free electron laser but at most 350 MHz for an accelerator of storage ring type.

The most conventional X-ray sensors comprise silicon photodiodes limited to a 1-GHz speed by their junction capacitances while their high-frequency dynamic range does not exceed from 30 to 50 dB. For measurements that are resolved in time rather than in frequencies, faster AsGa or diamond diodes are used, but their dynamic range is also insufficient (30 dB) while their fall times are contaminated by slow components having a duration from more than 0.1 (diamond) to 1 ns (GaAs).

The present invention applies to the study by X-ray absorption, diffusion or diffraction of the response of a sample submitted to a time-dependent deterministic disturbance with an accuracy that may be of a few picoseconds, for example on the order of from 2 to 5 ps (or from 500 to 200 GHz in the frequency range).

The present invention applies to the study by X-ray absorption, diffusion or diffraction of the response of a sample submitted to a time-dependent deterministic disturbance. It may either be a modulation at the indicated microwave frequencies, or periodic pulses of a duration of a few picoseconds, with a frequency spectrum containing Fourier components in the entire microwave range, from 1 to 200 GHz.

The case of an X-ray source of very high spectral radiance is here considered. It may be the undulator radiation delivered by an electron accelerator of storage ring type, such as that of the European Synchrotron Radiation Facility (ESRF) in Grenoble; it may also be a new 4-th generation synchrotron radiation source such as the European project of construction in Hamburg of a free electron laser emitting in the X-ray range and designated by acronym X-FEL. It should be noted that the pulses provided by such devices have a generally Gaussian profile in the time-frequency space.

A few significant figures characterize the type of X-ray sources used herein.

a. Monochromatic Undulator Radiation (ESRF):
number of X photons per packet: $2.84 \cdot 10^3$,
illuminated surface area:
without focusing: $3 \cdot 10^{-4}$ cm$^2$,
with focusing: $1 \cdot 10^{-6}$ cm$^2$,
duration of a pulse (packet): 50 ps,
RF repetition frequency: 352.202 MHz.

b. Polychromatic Undulator Radiation (ESRF):
number of X photons per packet: $1.42 \cdot 10^5$,
illuminated surface area without focusing: $3 \cdot 10^{-4}$ cm$^2$.

c. Free Electron Laser (X-FEL/Hamburg):
number of X photons per packet: $1 \cdot 10^{12}$,
illuminated surface area: $3.8 \cdot 10^{-5}$ cm$^2$,
duration of a pulse: <200 fs,
repetition frequency: <5 MHz.

SUMMARY OF THE PRESENT INVENTION

A detector according to the present invention comprises a semiconductor sensor across which negative differential resistance operating conditions are created. In the microwave range or in the range of millimetric waves, two large families of semiconductor devices operating under such conditions are known: the first one uses the Gunn-Hilsum effect; the second one exploits the Read-Johnston effect in which charge carriers are generated by avalanche in a p-n junction (IMPATT diode: IMPact ionization Avalanche Transit-Time diode). For simplicity, only sensors using the Gunn-Hilsum effect will be described herein, but Read-Johnston effect sensors may also be used. In semiconductors (III-V or II-VI) with an appropriate band structure such as GaAs, InP or CdTe, a negative differential resistance appears if an electric field greater than a given critical threshold is imposed (3.5 kV/cm for GaAs; 10.5 kV/cm for InP; 13.5 kV/cm for CdTe). Such a device is known to behave, according to the density of charge carriers, as an oscillator (Gunn diode) or as an amplifier in the range from 1 to 300 GHz.

The sensor converts the intensity of the incident X rays into pre-amplified electric pulses with a repetition frequency imposed by the X-ray source. This sensor has an antenna function (to transmit or receive). This antenna is electrically (or even magnetically) coupled to a microwave resonator enabling to select and to amplify in a narrow frequency range a selected harmonic component. The negative differential resistance amplifies microwave signals. The sensor may also be used as a mixer or a parametric amplifier capable of receiving a microwave signal capable of interacting with an amplified harmonic of the detected signal to form a highly sensitive heterodyne or superheterodyne receiver.

As a summary, the present invention provides using a sensor which transforms a short packet of X photons into a cloud of electrons in conditions such that the number of electrons is amplified. Periodic packets of X photons are sent into the sensor. The sensor is arranged in a resonator to select and amplify harmonic microwave signals generated by the periodic repetition of the amplified electron clouds. A detection circuit measures said harmonics.

More specifically, an embodiment of the present invention provides a detector of periodic packets of X photons, each packet having a duration shorter than 0.1 ns. This detector comprises a sensor comprising a III-V semiconductor element biased in a negative differential resistance region, this sensor being arranged in a resonant cavity tuned to a multiple (k) of the packet repetition frequency (F1).

According to an embodiment of the present invention, the semiconductor element is disk-shaped, electrodes for biasing the sensor facing each other on opposite surfaces of the disk, the resistivity of the semiconductor being selected to be high enough to avoid for the sensor to operate as an oscillator.

According to an embodiment of the present invention, biasing electrodes are arranged on a same surface of the semiconductor element.

According to an embodiment of the present invention, the semiconductor has a resistivity greater than from $10^7$ to $10^8$ Ω.cm.

According to an embodiment of the present invention, at least the electrode intended to operate as a cathode is transparent to X-rays.

According to an embodiment of the present invention, the sensor further comprises, on the anode side, a layer of a III-V semiconductor more heavily doped than the body of the semiconductor disk, this layer being coated with a first anode electrode and with a second anode electrode, the voltage difference between the second anode and the first anode being capable of enabling the amplified transmission of Gunn domains between the first and second anodes.

According to an embodiment of the present invention, the sensor further comprises a second cathode electrode opposite to each second anode electrode.

According to an embodiment of the present invention, the first and second cathodes and the first and second anodes are ring-shaped or interdigited.

According to an embodiment of the present invention, the output of said multiple (k) of the frequency of the packets is amplified and sent to a mixer having its other input receiving a multiple k.F1 of the frequency of the packets, wherein, further, the X-ray packets are gathered in trains of periodic packets at a low frequency (f0) with respect to the packet repetition frequency (F1), the mixer providing the low frequency (f0) which is analyzed in an analyzer.

According to an embodiment of the present invention, a microwave signal at a frequency k.F1+IF close to frequency kF1 of the k-th harmonic of frequency F1 of the X-ray packets is sent into the cavity, the X-ray packets being gathered in trains of periodic packets at a frequency (f0), and a signal at a frequency IF±f0 is extracted from the cavity, the signals at frequency IF±f0 being sent onto the first input of a mixer having its second input receiving signals at frequency IF.

The foregoing objects, features and advantages of the present invention will be discussed in detail in the following non-limiting description of specific embodiments, in conjunction with the accompanying drawings.

BRIEF DESCRIPTION OF THE DRAWINGS

FIG. 3A is a cross-section view of an example of a sensor which is a variation of the sensor of FIG. 2A and of its utilization mode, FIG. 3B is a bottom view, and FIG. 3C is a cross-section view of another alternative sensor;

FIG. 4 combines a cross-section and a perspective view of a sensor according to another embodiment of the present invention;

As usual in the representation of microcomponents, FIGS. 1 to 4 are not drawn to scale.

Identical or similar elements designated with the same references appear in several drawings. For the sake of brevity, the description of these elements will not be repeated in relation with each drawing.

DETAILED DESCRIPTION

In the detailed description of the present invention, the Gunn-Hilsum effect is assumed to be well known: it characterizes an entire family of devices generally designated as TEDs (transferred electron devices). A generic example is the Gunn diode: it is a III-V semiconductor which, in the proper conditions of biasing and dimensions in relation with the semiconductor doping level, operates as an oscillator and then behaves as a device with a negative differential resistance. Although all TEDs have a negative differential resistance, their doping level is not always sufficient to reach the (unsteady) self-oscillating state: they can however operate in (steady) amplifier mode or as a heterodyne mixer or parametric amplifier in the range from 1 to 300 GHz. The present invention mainly uses these devices as amplifiers and/or mixers.

The detection of very low intensity harmonic components is here considered and the devices which will be described all operate in amplification state and/or in heterodyne receiver state.

Sensor-First Embodiment

Figure 1:
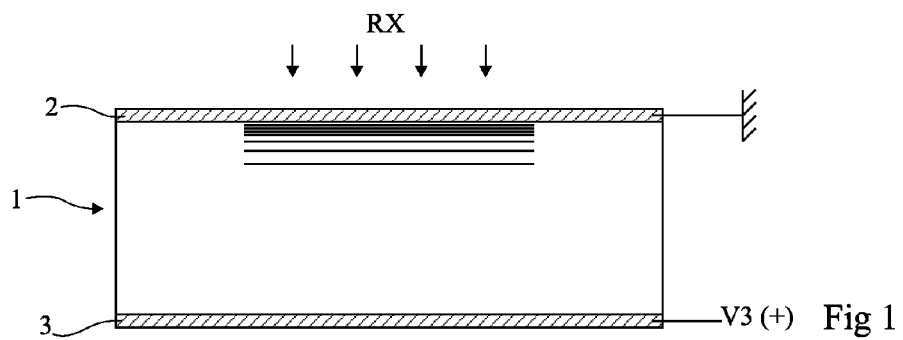
FIG. 1 is a cross-section view illustrating a sensor according to an embodiment of the present invention.

FIG. 1 shows an example of a sensor according to an embodiment of the present invention. The sensor is formed of a disk 1 of a III-V semiconductor material, for example gallium arsenide or indium phosphide, arranged between two electrodes, a front surface electrode 2 and a rear surface electrode 3. Rear surface electrode or anode 3 is brought to a voltage V3 which is strongly positive with respect to front surface electrode or cathode 2. The semiconductor material is of semi-insulating type and has a high resistivity, for example, greater than from $10^7$ to $10^8$ Ω.cm. The biasing is adjusted so that, in the quiescent state, the uniform electric field largely exceeds the threshold field of the Gunn-Hilsum effect. If the voltage of the front surface electrode is the ground, the rear surface electrode is brought to a voltage V3 enabling to apply an electric field on the order of from 15 to 35 kV/cm to the device. The sensor diameter is adapted to the surface illuminated by the incident X-ray beam, which may be focused. The disk may have a 2-mm diameter. Its thickness corresponds to a standard semiconductor wafer thickness (a few hundreds of μm).

Electrodes 2 and 3 form an ohmic contact with the semiconductor material. The material and the thickness of the front surface electrodes are selected to be substantially transparent to X-rays. It will for example be a thin AuGe or AuGeNi film of a thickness on the order of 100 nm. Under such conditions, no specific phenomenon occurs between the anode and cathode electrodes. More specifically, due to the strong resistivity of the semiconductor material, no self-oscillation phenomenon such as in a diode Gunn appears.

The sensor is submitted to a flow of incident X-rays (RX) on its front surface side. These X photons having a power from 2 to 20 keV, for example 8.4 keV, cross the cathode electrode with a negligible absorption, to be absorbed in the first micrometers of the thickness of semiconductor body 1. This is illustrated in the drawing by increasingly distant lines, the portion of highest density corresponding to the area in which statistically, the largest number of X photons will be absorbed. During their absorption, these X photons create electron-hole pairs in the semiconductor. It should be noted that there is a first multiplier effect due to the power of the X-rays, that is, each X photon creates a large number of electron-hole pairs: for example, the multiplication factor will be 2,000 for 8.4-keV photons for which the average absorption length in GaAs is $3.10^{-3}$ cm.

In the case of the flow of X photons delivered by the undulators of the ESRF and for an effective photo-ionization volume of $9.10^{-7}$ cm$^3$, a non-focused beam of monochromatic X rays cannot create an electron-hole density greater than $6.3.10^{12}$ cm$^{-3}$ in this volume. A density of carriers on the order of $10^{14}$ cm$^{-3}$ can be achieved by using a focused beam of monochromatic X rays ($2.1.10^{14}$ cm$^{-3}$), or a polychromatic undulator radiation ($3.1.10^{14}$ cm$^{-3}$). With the Hamburg free electron laser (X-FEL), the incident RX beam must be attenuated, for example by a metal filter of 25 µm of gold, to avoid exceeding the upper limit of charge carrier density, that is, $10^{17}$ cm$^{-3}$.

Bias voltage V3 of the device is selected to always have across the sensitive volume an electric field greater than the critical field of the Gunn-Hilsum effect. Even if the density of charge carriers is insufficient to reach the self-oscillating state, there exists in the considered area a negative differential resistance which translates as a negative dielectric relaxation time. This results in an amplification of the excess density of electrons created by photoionization. It should be noted that this is a wide-band amplification.

The generated holes drift towards the cathode while the electrons are attracted by the anode. Only these are sensitive to the amplification effect. The however never reach the anode with the previous assumptions. Indeed, the electron transit time over 300 µm (minimum thickness of the semiconductor disk) is of several tens of nanoseconds: this is much too long with respect to the lifetime of the electron plasma created by photoionization, which is approximately from 0.4 to 1 nanosecond.

The absorption of a packet of X photons in the sensor described in relation with FIG. 1 thus generates a self-amplified electric pulse which will have a lifetime from 400 to 1,000 ps. Given that that packets of X photons repeat at a frequency F1, there is a conversion of the packets of X photons into amplified electric pulses at a repetition frequency F1, which is in the radio frequency band.

Since the sensor is excited by a very short X-ray pulse (50 ps), its harmonic response also contains harmonics N×F1 of high rank N in the microwave range, or even in the millimetric wave range.

Sensor-Other Embodiments

Figure 2A:
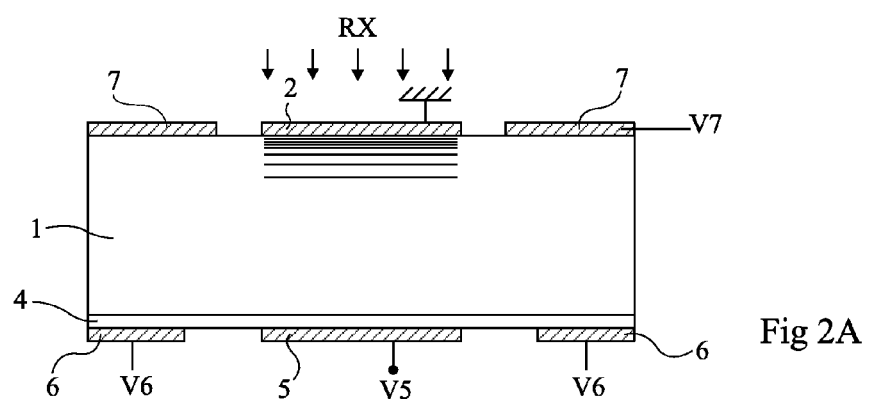
FIGS. 2A, 2B, and 2C respectively are a cross-section view, a top view, and a bottom view of an example of a sensor according to another embodiment of the present invention.
Figures 2B, 2C:
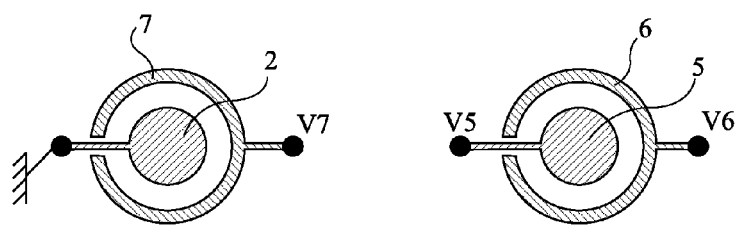

FIGS. 2A, 2B, and 2C respectively are a cross-section view, a top view and a bottom view of a sensor according to a second embodiment of the present invention. On the lower surface of semiconductor disk 1, a thin layer 4 of the same semiconductor as the disk has been formed, for example by epitaxy. Layer 4 has a thickness ranging from approximately 2 to approximately 5 µm, for example 3 µm. In layer 4, the density of the charge carriers is on the order of from 3 to $5.10^{16}$ cm$^{-3}$ and is much greater than that of semiconductor body 1, which is only approximately $10^8$ cm$^{-3}$ for a resistivity greater than $10^7$ Ω.cm. The resistivity of layer 4 for example is on the order of 0.1 Ω.cm. As illustrated by the top view of FIG. 2B, on the front surface, cathode electrode 2 no longer totally covers the entire disk surface. On the rear surface, directly opposite to the cathode electrode, an electrode 5 which will be called first anode hereafter is deposited on thin layer 4. As shown by the bottom view of FIG. 2C, a peripheral electrode 6, concentric to first anode electrode 5, is also formed on layer 4. Electrode 6 will be called second anode hereafter.

The distance separating the first anode from the second anode may vary from 15 to 150 µm according to the needs of the envisaged applications. First anode 5 will be brought to a voltage V5 selected substantially like voltage V3 mentioned in relation with FIG. 1. Second anode 6 will be brought to a voltage V6 greater than V5. Voltage difference V6−V5 is adjusted so that the electric field between the first and the second anode is only faintly smaller than the critical field of the Gunn-Hilsum effect. The second anode and cathode electrodes (AuGe) form ohmic contacts with the semiconductor. The first anode electrode forms a Schottky-type contact with thin layer 4. Opposite to the second anode electrode, on the front surface, another electrode (AuGe) 7 brought to a voltage V7 negative with respect to that of cathode 2, for example to a voltage V7=V5−V6, may be formed. The function of electrode 7 is to impose to the electrons created by photo-ionization in semiconductor body 1 to drift towards the first anode and not towards the second anode.

When the cathode electrode of the sensor of FIG. 2A is crossed by an X-ray flow, the same mechanisms as those detailed in relation with the sensor of FIG. 1 develop in semiconductor body 1 between the cathode and the first anode. Further, the electric field decrease in the effective volume where the electron-hole plasma creates is compensated by an increase in the electric field outside of this volume. This increases the electric field, especially in the depleted area located under first anode 5. This electric field disturbance initiates the nucleation in layer 4 of a Gunn domain drifting from the first anode to the second anode with a very fast amplification due to the very high density of charge carriers in layer 4.

Thus, the photoionization process caused by the absorption of a packet of X photons results in two synchronously-triggered electric pulses, which then drift along orthogonal directions. Further, their lifetimes will be different. There would exist a process of fast relaxation of the excess field at a 30-picosecond time scale: when the electric field comes back down below the critical field of the Gunn-Hilsum effect, not only does this stop any chance of nucleation of new Gunn domains, but also the dielectric relaxation time becomes positive again, which this time causes the fast attenuation of the pulse (although it had been amplified for the 30 previous picoseconds). If the first pulse created between the cathode and the first anode has no chance of reaching the first anode, similarly, the second pulse created between the first and the second anode has barely more chances of reaching the second anode. On the other hand, this fast pulse process is capable of promoting a frequency response rich in high-order harmonics, which is one of the desired aims.

The sensor of FIG. 2 could be submitted to a flow of X rays arriving at normal incidence on the first anode electrode of the lower surface, selected to be transparent to X rays.

FIG. 3A is a cross-section view of an example of a sensor which is a variation of the sensor of FIG. 2A and of its utilization mode, FIG. 3B is a bottom view, and FIG. 3C is a cross-section view of another variation of the sensor. These examples are more specifically adapted to an irradiation from the lower surface.

As shown in FIG. 3A and in FIG. 3B, which is a bottom view corresponding to FIG. 3A, the sensor comprises a part 1 made of a semiconductor material of type III-V. On the lower surface side, a thin layer similar to thin layer 4 of FIG. 2 is deposited. Spaced apart electrodes 10 and 11 are arranged opposite to each other on thin layer regions. A front surface electrode 2 is arranged at least opposite to the interval between electrodes 10 and 11 and forms a cathode. Rear surface electrodes 10 and 11 form anodes, respectively at voltages V10 and V11. One of these voltages, for example, V11, is greater than the other so that in the absence of X rays, a planar field slightly smaller than the critical field of the Gunn-Hilsum effect is created between these two electrodes.

Anodes 10 and 11 create together with cathode electrode 2 a field having a vertical main component. On this respect, the two electrodes together play the role of the first anode of the previous embodiments.

X-rays reach the lower surface in a region comprised between anodes 10 and 11. The attenuation length of the X rays being on the order of 30 μm, the majority of the electron-hole pairs will be created in semiconductor 1, but in the vicinity of epitaxial layer 4. The electrons will be accelerated by a transverse electric field component (from cathode 2 to anode 11 at the highest voltage). Due to this transverse acceleration, the electric pulse created by photoionization here also benefits from a wide-band convective amplification, just as in the case of a sensor formed according to the embodiment of FIG. 1 or according to the embodiment of FIG. 2A. The convective amplification will become faster and more efficient as soon as the electrons penetrate into epitaxial layer 4 where the high density of the charge carriers enhances the amplification.

A planar electric field component (from anode 11 to anode 10) is also present in the vicinity of epitaxial layer 4. Outside of the electric cloud created by photoionization, there will be an increase of the electric field, which may become slightly greater than the critical field of the Gunn-Hilsum effect, in particular towards anode 11. A Gunn domain drifting towards anode 11 all along the lifetime of the photo-electron plasma may also be created in layer 4 of high doping level. Since two Gunn domains cannot develop simultaneously, the two amplification processes will finally have to be self-controlled to eventually result in a greater amplification of the conversion of the X photons into an electric pulse drifting in a 2-dimensional space.

FIG. 3C is a cross-section view illustrating a variation of the assembly of FIG. 3A in which both anodes 10 and 11 are covered with an insulating film 12, for example, polyimide (Kapton: 25-μm thickness), having its external surface covered with a conductive layer 13, for example, aluminum, and brought to the same voltage as anode 10 (V13=V10).

FIG. 4 shows a planar version of a sensor corresponding to the embodiment of FIG. 2A. The sensor is formed on a narrow plate 15 (80 mm×4 mm) cut in a wafer of standard thickness (340 μm) of semiconductor forming an appropriate substrate. Two thin layers, respectively 1 et 4, of the same semiconductor and of substantially close thicknesses, are formed on the substrate. Layer 1 is semi-insulating and has a resistivity greater than $10^7$ Ω·cm. Layer 4 corresponds to a much higher doping level resulting in a density of charge carriers on the order of from 3 to $5.10^{16}$ cm$^{-3}$, like layer 4 of the sensor of FIG. 2A. Three electrodes are deposited at the surface: a grounded cathode 2, a first anode 5 forming a Schottky-type contact with semiconductor layer 4 and brought to voltage V5, and a second anode 6 brought to voltage V6. A properly focused X-ray beam (RX) will illuminate under grazing incidence (4 to 6°) thin layer 1 between the cathode and the first anode. The X-rays arrive with a very low incidence to be able to be totally absorbed in thin layer 1 and to ensure a better contrast in the forming of the electron-hole plasma.

Cavity

The previously-described sensor is arranged in a microwave resonant cavity tuned to a harmonic k.F1 of repetition frequency F1 of the packets of X photons.

In the case of a source having the characteristics of the ESRF, it will for example be chosen to detect harmonic 24 of frequency F1. The sensor will behave as a transmitting microwave antenna if the electric dipole, formed in the sensor, oriented along the displacement direction of the electric charges, and oscillating at frequency k.F1, coincides with a maximum electric field of the resonance mode of the cavity. The sensor may be attached on a sapphire rod having minimum dielectric losses. The X rays may be introduced through a beryllium window of a 50-μm thickness totally transparent to X-rays, but ensuring the electric continuity of the metal walls of the cavity.

It should be noted that the cavity does not only have the function of a frequency filter. After a transient phase lasting for a time depending on the quality factor of the cavity (for example 30 ns if Q=1000), a voltage oscillating at the microwave frequency (k.F1), which superposes to the static bias voltage, settles in the active area of the sensor. This microwave signal is itself amplified due to the negative differential resistance associated with the Gunn-Hilsum effect. A resonant amplification state then develops. It should be noted that this amplification has a very narrow frequency band.

For a sensor of the type in FIG. 1, the microwave resonance cavity may be an X-band cavity based on a resonant standard rectangular waveguide section in mode $TE_{102}$. The resonance frequency of the cavity can be finely tuned due to a mobile short-circuit while an iris diaphragm of optimized dimension enables to couple the cavity to a detection circuit.

With sensors of the type described in relation with FIG. 2A or 3A, the corresponding antennas can no longer couple to the electric field of a rectangular guide resonant cavity. In the case of sensors with a radial symmetry illustrated in FIGS. 2B and 2C, it is desirable to use a cylindrical resonant cavity having a $TE_{011}$ or $TE_{012}$ resonance mode which also provides a radial symmetry of the electric field distribution. This consideration also prevails in the case of interdigited electrodes.

For a sensor of the type in FIG. 4, the electric pulses generated between the cathode and the first anode or between the first anode and the second anode drift along the same axis and in the same direction. Such a sensor can thus be electrically coupled to a standard cavity with a rectangular section and having a $TE_{101}$ resonance mode.

If the X rays are circularly polarized, a small part of the electrons created in the sensor will have a spin polarization. As suggested by Yunong Qi, Zhi-G. Yu, and M. E. Flatté in "Spin-Gun Effect", Phys. Rev. Letter 96, 026602 (2006), this spin polarization should be amplified by Gunn effect. The present invention, and more specifically the embodiment of FIG. 3, should enable to verify the rightness of this theory. The presence of electrons, a majority of which has a privileged spin polarization, translates as the presence of an oscillating magnetic dipole which may be detected by magnetic resonance in a microwave cavity magnetically coupled to the oscillating dipole.

Detection Circuit

The power radiated by a microwave antenna such as described previously remains very low and scarcely exceeds a few nanowatts. Further, the noise temperature (or the amplification ratio of the electronic noise) of a Gunn-Hilsum effect amplifier is mediocre. Sensitive measurement circuits must be provided, but the bandwidth of the electronic noise must also be decreased.

Figure 5:
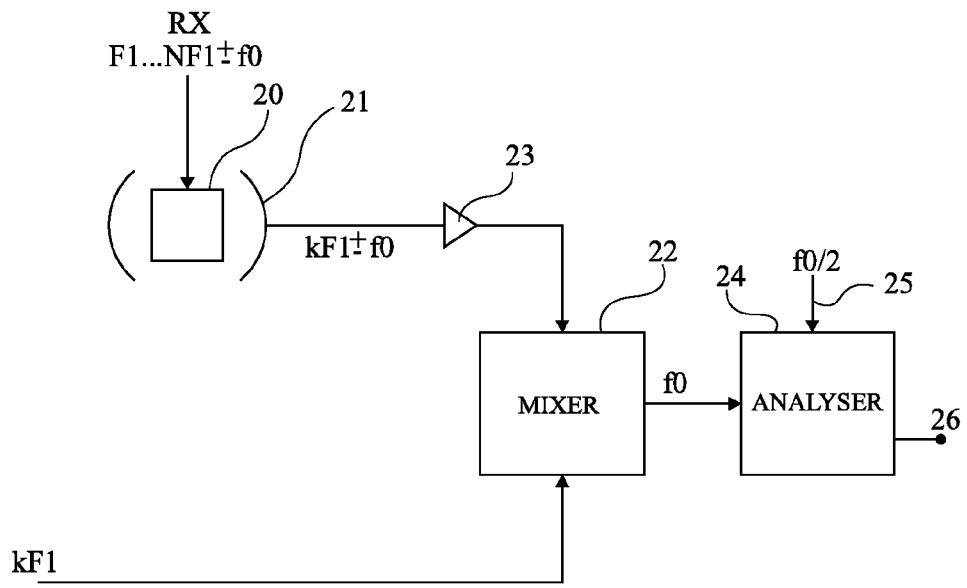
FIG. 5 shows an embodiment of a heterodyne receiver assembly according to a first utilization mode of the present invention.
Figure 6:
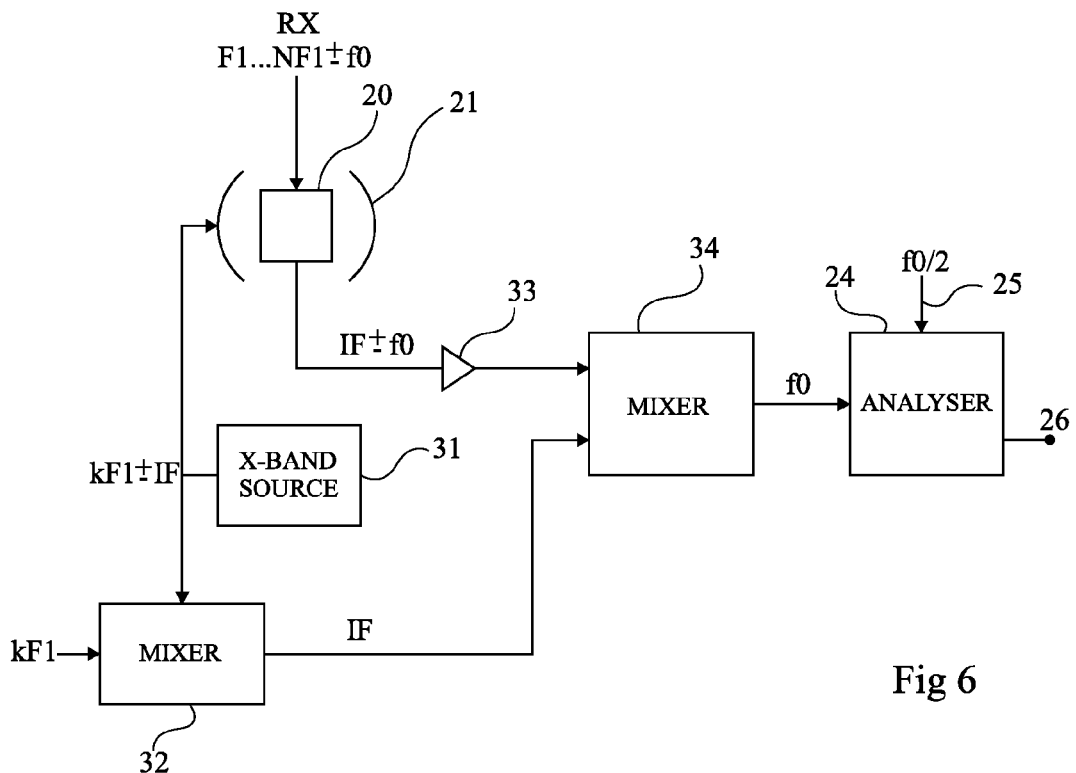
FIG. 6 shows an embodiment of a super-heterodyne receiver assembly according to a second utilization mode of the present invention.

FIGS. 5 and 6 illustrate two embodiments of a heterodyne detection adapted to the use of the sensors of the present invention. In these drawings, a sensor (TED) such as described previously, or the like, generally designated with reference numeral 20, is inserted into a resonant cavity 21 tuned to harmonic k.F1 of repetition frequency F1 of the packets of X photons. It is considered that the trains of X-ray packets exhibit an amplitude modulation at a frequency f0 which is low as compared with frequency F1, and all the lower as compared with k.F1. For example, in the case of the ESRF synchrotron radiation source, the trains of X ray packets exhibit an amplitude modulation at frequency f0=F1/

992=355 kHz which is the cyclic repetition frequency of the electrons in the storage ring. This perfectly synchronous modulation of frequency F1 of the accelerator is due to a (deliberately) incomplete filling of the 992 packets of electrons which generate the synchrotron radiation. A consequence of this amplitude modulation at frequency f0 is the appearance of two satellites corresponding to frequencies k.F1±f0 in the frequency space.

In the example illustrated in FIG. 5, the output (k.F1±f0) of the cavity is sent onto a first input of a microwave mixer 22 via a microwave amplifier 23 with a very low electronic noise (LNA: Low Noise Amplifier). A second input of mixer 22 receives a reference signal at frequency k.F1. Mixer 22 is provided so that its output is a signal at a frequency $f_0$ with an amplitude proportional to the amplitude of the modulation satellites at frequencies k.F1±f0. This signal is measured by means of a vector spectrum analyzer 24 with a wide dynamic range, for example more than 150 dBc. This analyzer also receives a synchronous triggering signal 25, for example, at frequency f0/2, and outputs a signal characteristic of the amplitude of the k-th harmonic of frequency F1.

The approach illustrated in FIG. 6 exploits all the functionalities of the Gunn-Hilsum effect. More specifically, it is here used as a mixer-amplifier or as a parametric amplifier in the range of microwaves or millimetric waves.

In FIG. 6, resonant cavity 21 containing sensor 20 is excited by a microwave generator 31 at frequency k.F1±IF. Frequency shift IF will be arbitrarily selected in the range from 1 to 10 MHz, for example 2 MHz. A microwave mixer 32 receives the output of generator 31 and a reference signal at frequency k.F1 and provides a reference signal at intermediary frequency IF. Further, in resonant cavity 21, the microwave mixer function of sensor 20 will translate as the appearance of a signal at intermediary beat frequencies IF±f0. This low-frequency signal can be directly sensed on an electrode of the sensor and is applied to an appropriate very low noise amplifier 33 before being injected onto a first input of an analog precision amplifier 34 (IF mixer), having its other input receiving reference signal IF. This device thus behaves as a superheterodyne demodulator. The analysis of the output signal at frequency f0 may once again be performed in a vector spectrum analyzer 24 as in the case of FIG. 5.

The detection illustrated in FIG. 6 has many advantages. A first advantage is that the amplification internal to the sensor of beat signal IF±f0 by negative differential resistance effect is very efficient. A second advantage is that the beat signal is proportional to the intensity of the microwave signal of the external generator (for example, a few tens of milliwatts): this introduces a significant multiplication factor (gain) of very low noise. A third advantage is that this detection mode can easily be extended to the field of millimetric waves (300 GHz) while the availability of an amplifier 22 of large gain and very low noise (see FIG. 5) is a problem at very high frequencies (which is not the case for amplifier 33).

Generally, other alternative embodiments of the sensors, of the microwave resonator and of the electronic detection circuit will occur to those skilled in the art, in the context of the present invention such as discussed herein in relation with specific embodiments for a chosen application.

A detector enabling to analyze a harmonic of the repetition frequency of a train of X photon packets has been described herein. For a more complete study of an X-ray absorption, diffusion, or diffraction phenomenon by a sample, several detectors tuned to different harmonics of the fundamental packet repetition frequency may be used to obtain several points of the Fourier transform of the signal to be analyzed and to more accurately trace back the time signal.

Further, examples of application of the present invention adapted to the synchrotron radiation of the Grenoble ESRF have been more specifically described. The repetition frequency then being 352.202 MHz, harmonic 24, which is in the microwave range, is for example considered. If the case where the source is an X-FEL-type free electron laser having a repetition frequency on the order of 5 MHz was for example considered, a much high harmonic would preferably be selected, for example a harmonic of an order greater than 2000 to reach frequencies greater than 10 GHz.

Of course, many alternative embodiments of the resonator and of the electronic detection circuit will occur to those skilled in the art, in the context of the present invention such as discussed herein in relation with specific embodiments.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A detector of periodic packets of X photons, each packet having a duration shorter than 0.1 ns, comprising a sensor (20) comprising a III-V semiconductor element biased in a negative differential resistance region, said sensor being arranged in a resonant cavity (21) tuned to a multiple (k) of the packet repetition frequency (F1).

2. The detector of claim 1, wherein the semiconductor element is disk-shaped electrodes (2,3) for biasing the sensor facing each other on opposite surfaces of the disk comprising an anode and a cathode, the resistivity of the resistivity of the semiconductor being selected to be high enough to avoid for the sensor to operate as an oscillator.

3. The detector of claim 1, wherein biasing electrodes are arranged on a same surface of the semiconductor element.

4. The detector of claim 1, wherein the semiconductor has a resistivity greater than from $10^7$ to $10^8$ Ω.cm.

5. The detector of claim 2, wherein at least the electrode intended to operate as a cathode (3) is transparent to X-rays.

6. The detector of claim 2, wherein the sensor further comprises, on the anode side, a layer (4) of III-V semiconductor more heavily doped than the body of the semiconductor disk (1), this layer being coated with a first anode electrode (5) and with a second anode electrode (6), the voltage difference (V6−V5) between the second anode and the first anode being capable of enabling the amplified transmission of Gunn domains between the first and second anodes.

7. The detector of claim 6, wherein the sensor further comprises a second cathode electrode (7) opposite to each second anode electrode (6).

8. The detector of claim 7, wherein the first (2) and second (7) cathodes and the first (5) and (6) anodes are ring-shaped or interdigited.

9. The detector of claim 1, wherein the output of said multiple (k) of the frequency of the packets is amplified and sent to a mixer (22) having its other input receiving a multiple k.F1 of the frequency of the packets, wherein, further, the X-ray packets are gathered in trains of periodic packets at a low frequency (f0) with respect to the packet repetition frequency (F1), the mixer providing the low frequency (f0) which is analyzed in an analyzer (26).

10. The detector of claim 1, wherein a microwave signal at a frequency k.F1+IF close to frequency kF1 of the k-th harmonic of frequency F1 of the X-ray packets is sent into the cavity, the X-ray packets being gathered in trains of periodic packets at a frequency (f0), and a signal at a frequency IF±f0 is extracted from the cavity, the signals at frequency IF±f0 being sent onto the first input of a mixer (34) having its second input receiving signals at frequency IF.

* * * * *